US009912758B2

(12) United States Patent
Allinson

(10) Patent No.: US 9,912,758 B2
(45) Date of Patent: Mar. 6, 2018

(54) CONTINUING AN APPLICATION SESSION ON A DIFFERENT DEVICE

(71) Applicant: Yahoo Holdings, Inc., Sunnyvale, CA (US)

(72) Inventor: Ric Allinson, Sunnyvale, CA (US)

(73) Assignee: YAHOO HOLDINGS, INC., Sunnyvale, CA (US)

(*) Notice: Subject to any disclaimer, the term of this patent is extended or adjusted under 35 U.S.C. 154(b) by 70 days.

(21) Appl. No.: 14/572,215

(22) Filed: Dec. 16, 2014

(65) Prior Publication Data
US 2016/0173617 A1 Jun. 16, 2016

(51) Int. Cl.
H04L 29/08 (2006.01)
(52) U.S. Cl.
CPC ............ H04L 67/148 (2013.01); H04L 67/02 (2013.01)
(58) Field of Classification Search
CPC .............................. H04L 67/148; H04L 67/02
See application file for complete search history.

(56) References Cited

U.S. PATENT DOCUMENTS

| 2002/0016353 | A1  | 11/2002 | Thomas et al. |            |
|--------------|-----|---------|---------------|------------|
| 2003/0065784 | A1* | 4/2003  | Herrod        | H04W 28/18 |
|              |     |         |               | 709/227    |
| 2003/0019596 | A1  | 10/2003 | Song et al.   |            |
| 2008/0289029 | A1* | 11/2008 | Kim           | G06F 17/30905 |
|              |     |         |               | 726/12     |
| 2009/0055542 | A1* | 2/2009  | Zhao          | H04L 29/06 |
|              |     |         |               | 709/228    |
| 2009/0063690 | A1* | 3/2009  | Verthein      | H04L 67/14 |
|              |     |         |               | 709/228    |
| 2011/0005562 | A1  | 3/2011  | Zawacki et al.|            |
| 2011/0055627 | A1* | 3/2011  | Zawacki       | H04L 67/14 |
|              |     |         |               | 714/15     |
| 2014/0135105 | A1* | 5/2014  | Quan          | H04L 67/1095 |
|              |     |         |               | 463/24     |

OTHER PUBLICATIONS

International Search Report and Written Opinion dated Mar. 3, 2016 in International Application PCT/US2015/066029.
International Preliminary Report on Patentability dated Jun. 29, 2017 in International Application PCT/US2015/066029.

* cited by examiner

Primary Examiner — Philip Chea
Assistant Examiner — Wuji Chen
(74) Attorney, Agent, or Firm — Pillsbury Winthrop Shaw Pittman, LLP

(57) ABSTRACT

The present teaching relates to continuing a user session of an application from one device to another device. Information related to a first user session of a first application installed on a first device is received. The first user session information may indicate content and content presentation provided via the first application. A request, based on a pre-defined URL, for the first session information is received from a second device. Responsive to the request, the information related to the first user session is provided to the second device so that a second user session of a second application at the second device provides the same content in the same presentation as in the first user session. The first and second user sessions both may be associated with a same specific user identity, and the first and second applications have at least one common function.

20 Claims, 13 Drawing Sheets

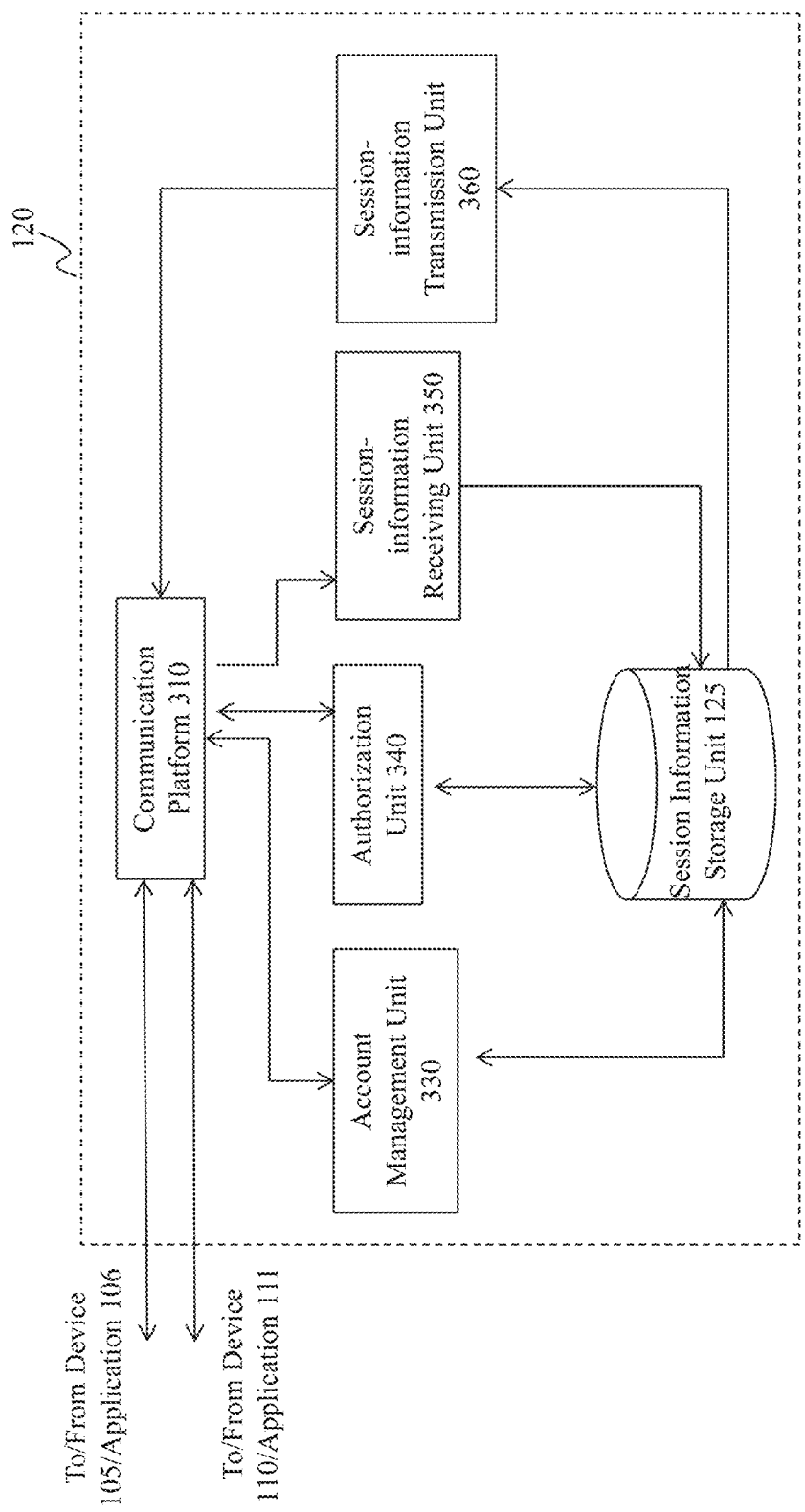

CONTINUING AN APPLICATION SESSION ON A DIFFERENT DEVICE

BACKGROUND

1. Technical Field

The present teaching relates to continuing a user session of an application initiated on one device on to another device; specifically, continuing a browser session from one user device to another device.

2. Discussion of Technical Background

In general, users are increasingly using multiple computing devices (e.g., of different form factors) to access the Internet, interact with one or more application(s), communicate with other users, etc. However, the present solutions may not allow users to seamlessly transition a session of an application (e.g., a web browser) initiated on a first device to a second device, such that the user may be presented with the same content and in the same presentation format on the second device as last accessed on the first device.

For example, typically, when a user switches to a different device, to continue a web browser session from a previous device, the user may have to remember or e-mail or message to self the web address of the last accessed web page, and manually provide that web address in the web browser to load the webpage. Further, the user may or may not remember the specific details of how that webpage was presented to the user (e.g., precise location on the webpage) just before the user switched to the new device. In some sense, the user may just have to completely re-start a new session of the application on the new device isolated from a previous session, i.e., without any benefit of history of the previous session of the same application. As such, the user may experience lack of connectedness and continuity in using same or similar applications across different devices or computing platforms.

SUMMARY

The teachings disclosed herein relate to methods, systems, and programming for advertising. More particularly, the present teaching relates to methods, systems, and programming related to exploring sources of advertisement and utilization thereof.

In one example, a method, implemented on a machine having at least one processor, storage, and a communication platform capable of connecting to a network for continuing a user session of an application from one device to another device is disclosed. Via the communication platform, at a session information receiving unit from a first device, information related to a first user session of a first application installed on the first device may be received. The first user session is associated with a certain user identity, and the information related to the first user session indicates content and a presentation of the content provided via the first application on the first device. The information related to the first user session of the first application may be stored at a storage unit.

Further, via the communication platform, at a session information transmission unit from a second device, a request for the information related to the first user session of the first application may be received. The request may be based on accessing a pre-defined uniform resource locator, and my be associated with the certain user identity. The information related to the first user session may be provided by the session information transmission unit to the second device. Based on the information related to the first user session, a second user session of a second application at the second device provides the content in the presentation indicated by the information related to the first user session. The second user session is associated with the certain user identity, and the first and second applications have at least one common function.

In another example, a system to continue a user session of an application from one device to another device is disclosed. The system may include a storage unit, a session information receiving unit, and a session transmission unit. The session information receiving unit may be configured to receive, from a first device, information related to a first user session of a first application installed on the first device, and store the information related to the first user session at the storage unit. The first user session is associated with a certain user identity, and the information related to the first user session indicates content and a presentation of the content provided via the first application on the first device.

The session information transmission unit may be configured to receive, from a second device, a request for the information related to the first user session of the first application based on a pre-defined uniform resource locator, wherein the request is associated with the certain user identity. The session information transmission unit may be further configured to provide the information related to the first user session to the second device so that a second user session of a second application at the second device provides the content in the presentation indicated by the information related to the first user session. The second user session is associated with the certain user identity, and the first and second applications have at least one common function.

In a different example, a device to continue a user session of an application initiated on another device is disclosed. The device may include at least one processor programmed to execute one or more computer program instructions which, when executed, cause the at least one processor to execute a first application to initiate a first user session, and send a request for information related to a second user session of a second application installed on another device. The request may be generated and sent by accessing a pre-defined uniform resource locator. The information related to the second user session indicates content and a presentation of the content provided via the second application on the other device, and the first and second applications have at least one common function. The information related to the second user session of the second application is received, and the content is provided in the first user session in the presentation indicated in the information related to the second user session.

Other concepts relate to software for implementing the present teaching on continuing a user session of an application initiated on one device on to another device. A software product, in accord with this concept, includes at least one machine-readable non-transitory medium and information carried by the medium. The information carried by the medium may be executable program code data, parameters in association with the executable program code, and/or information related to a user, a request, content, or information related to a social group, etc.

In one example, a machine-readable, non-transitory and tangible medium having data recorded thereon for continuing a user session of an application from one device to another device, wherein the medium, when read by the machine, causes the machine to perform a series of operations, including, receiving, from a first device, information related to a first user session of a first application installed on the first device. The first user session is associated with a certain user identity, and the information related to the first user session indicates content and a presentation of the content provided via the first application on the first device. The operations may also include storing, at a storage unit, the information related to the first user session of the first application; receiving, from a second device, a request for the information related to the first user session of the first application based on a pre-defined uniform resource locator, wherein the request is associated with the certain user identity; and providing the information related to the first user session to the second device so that a second user session of a second application at the second device provides the content in the presentation indicated by the information related to the first user session. The second user session is associated with the certain user identity, and the first and second applications have at least one common function.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 3 illustrates an example of a session continuation server, in accordance with various embodiments of the present disclosure;

DETAILED DESCRIPTION

Figure 1:
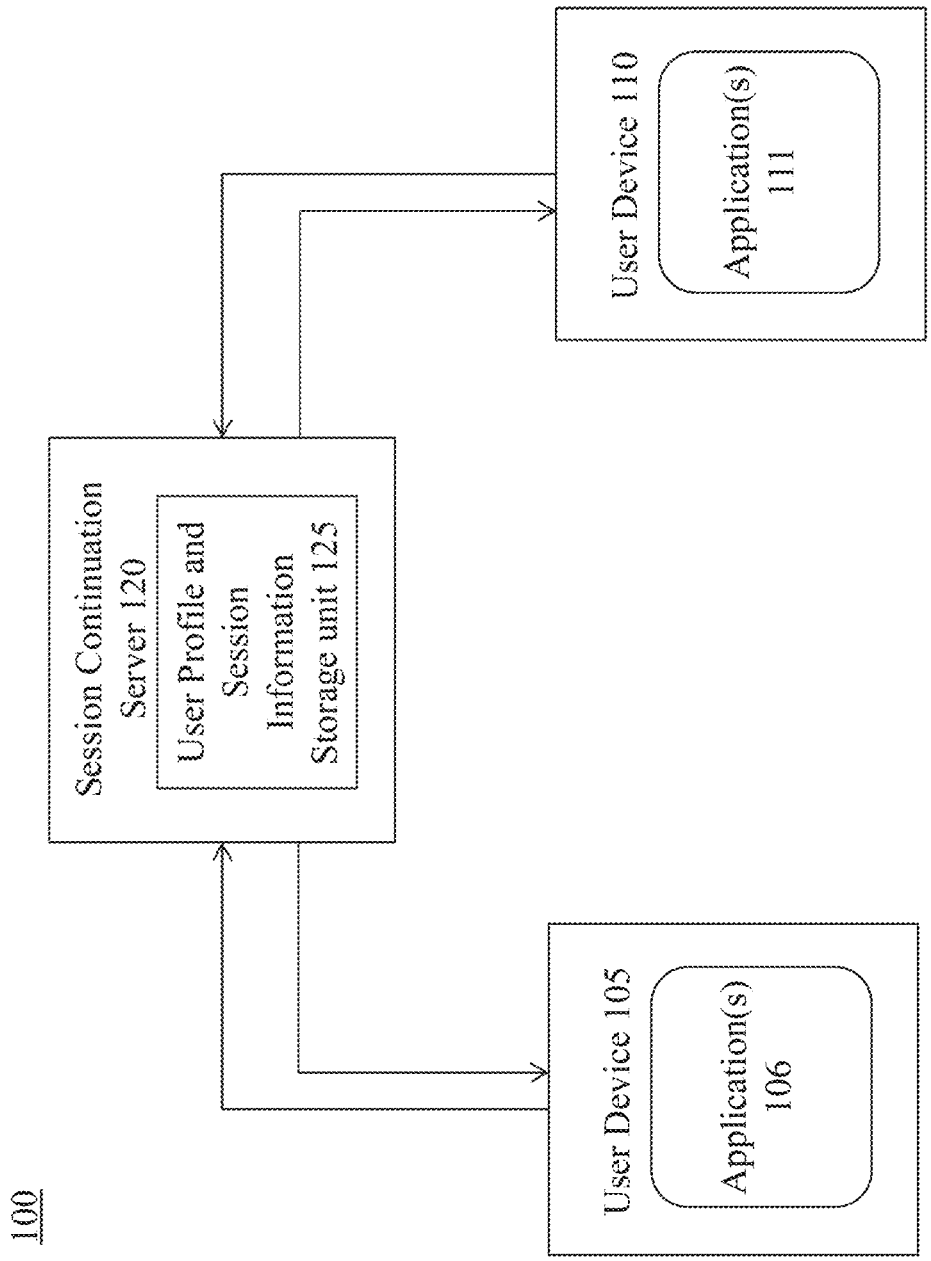
FIG. 1 illustrates an example of a system to enable continuation of a user session of an application from one device to another device, in accordance with various embodiments of the present disclosure.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present disclosure generally relates to systems, methods and other implementations directed to continuing a session of an application that is being executed or was previously executed on one device on to another device. The systems, methods, and other implementations disclosed herein may be realized as a specialized and networked system by utilizing one or more computing devices (e.g., mobile phone, personal computer, etc.), and (wired or wireless) network communications. As an example, the present disclosure relates to seamless continuation of a web browser session that is a currently active or was previously active on one user device (e.g., a desktop computer) to another user device (e.g. a tablet computer).

In the context of the present disclosure, a "session" of an application installed on a device may be defined as one or more time periods of execution of and/or user activity with the application on the device. For example, with respect to a web browsing session, a session may relate to one or more time periods during which (1) a web browser installed on a device is launched or activated, (2) one or more websites are accessed (based on their respective web addresses) through the web browser, (3) content of the website(s) is presented to the user via the web browser (e.g., on one or more tabs of the web browser), (4a) the website content is consumed and/or manipulated, (4b) one or more functionalities of the web browser are activated (e.g., the scroll bar of the browser is actuated to move the webpage in the vertical and/or horizontal directions), (5) the web browser is closed, and/or other operations. Although, the above description of "session" relates to interactions with a web browser, that description is not intended to be limited to the use of browsers. Similar interactions with and executions of other applications installed on a device may constitute as sessions of those respective applications.

Accordingly, the example of continuing a web browsing session of one device on to another device may relate to presenting the same content (e.g., a webpage) in the same presentation format (e.g., at the same scrolled location of the webpage) via a browser on one device that is being provided or was previously provided via another browser on another device. The techniques described herein that are directed to continuation of a user session of an application may allow users to seamlessly and effortlessly continue a task (related to a certain application) when transitioning one device to another device without having to remember or manually enter details about the application on the other device. As an example, a user may be reading (or was reading) an article on a webpage presented on a smartphone's browser and has scrolled down to, say 50% of the webpage, when the user ends the browser session on the phone and/or decides to transition to a desktop computer.

At a later time, using the browser on the desktop computer, the user may wish to continue reading the webpage article, but may not remember any details of the browser session on the phone (e.g., the exact webpage address, location on the webpage where the previous session ended, etc.). Based on the teachings of the present disclosure, the user may request the exact last phone-browser session on the desktop's browser (without having to provide any specific details about the last browser session), and may be presented on the desktop's browser with the same webpage article at the same webpage location where the last phone-browser session ended. As such, the user may be able to maintain synchronization of one or more application sessions across multiple devices, and as needed, seamlessly continue the application session(s) to interact with the same content in the same presentation format as last accessed on one or more of the previous devices or previous application sessions.

FIG. 1 illustrates a system 100 depicting a broad overview of an embodiment to enable continuation of a user session of an application from one device to another device. As shown, system 100 includes a first device 105, a second device 110, a session continuation server 120. First and second devices 105, 110 each may be a computing device accessible by one or more users, e.g., a personal computer, a tablet computer, a smartphone, a wearable computing device, and/or other computing devices. First and second devices 105, 110 may be devices of similar or different form factors, and may include (and be operational in accordance with) a same/similar operating system or a different operating system (e.g., Google Android operating system, Apple IOS or OS X operating system, Microsoft Windows operating system for desktops or mobile devices, etc.). First and second devices 105, 110 may be different, separate devices, or may be a single device that is communicatively associated at least with session continuation server 120. Further, first and second devices 105, 110 each may have installed thereon one or more applications (e.g., applications 106, 111, respectively). The applications may include, such as, but not limited to, browsers, e-mail applications, word processing applications, note-taking applications, search engine-related applications, online retailer-specific applications, mobile "apps" and/or other applications. Applications 106, 111 may be different in terms of their source or developers, but have at least common functionality, based on which a session of application 106 (on device 105) may be synchronized to and continued on application 111 (on device 110), or vice-versa. For example, both of applications 106, 111 may be graphical web browsers, but one of them may be Internet Explorer browser, and the other may be Firefox browser.

One or more of the installed application(s) may be pre-designed or pre-configured (e.g., based on pre-integrated JavaScript code, etc.) to keep track of user activities with the application, and continuously collect one or more states of the application. One or more of the installed applications (e.g., application 106) may further be pre-designed or pre-configured to store the collected details about user activities and state information of the application (e.g., at device 105) at a local storage unit of device 105, and also communicate such collected details and state information from device 105 to session continuation server 120 for processing and storage (at storage unit 125). For example, in an instance where application 106 is a web browser, when a user opens a web page in web browser 106, the JavaScript (JS) code associated with the webpage or web browser 106 creates a connection to session continuation server 120. This connection may be made using Web Sockets, JSONP, etc. Further, the JS code may send the user identification information, and session information including the uniform resource locator (URL) of the webpage just opened in web browser 106 to server 120 for storage. As the user scrolls (vertically or horizontally) the webpage in web browser 106, the current web page position changes, and the JS code keeps sending an update (as part of the same session information) regarding the new webpage position, e.g., in terms of a percentage of webpage scrolled, to session continuation server 120. Other data may be optionally sent to server 120 in the form of key-value pairs. If the user, however, navigates away from the current webpage and loads a new webpage, a new session is initiated and a new connection between the web browser and server 120 is made for recording information about the new session.

The application(s) at requesting device 110 (e.g., application 111) may be configured to request and activate the service provided by session continuation server 120 (e.g., by accessing a pre-defined URL related to session continuation server 120) to continue the session of application 106 (initiated at device 105) on application 111 at device 110. Accordingly, responsive to the request for a continued session (based on the pre-defined URL), session continuation server 120 may communicate details and state information of one or more previous sessions of application 106 (e.g., initiated at device 105) to device 110, so that application 111 may provide the content in the presentation format as last captured for application 106.

For example, to request a continued browser session of an application, device 110 may first access a pre-defined URL related to the session continuation server 120 (e.g., by typing "last.yahoo.com" in a browser). Responsive to the request for a continued browser session from device 110, session continuation server 120 may communicate, to device 110, web address(es) and details about the webpage(s) position(s) (e.g., in terms of percentage of webpage scrolled in web browser 106) captured for a last session of web browser 106. Based on the session information received from server 120, web browser 111 may access and display the same webpage and at the same webpage scroll position at device 110, as in the last session of application 106. As such, the techniques discussed herein may allow a user to browse a webpage on a device, and continue that browsing session at the same webpage and at the same location where the user previously left the session. The user may be able to request to load a previous browser session at another device, at another browser on the same device, or at another tab of the same browser at the same device by accessing a certain pre-specified URL (related to session continuation server 120).

In an implementation, recorded user activity and collected states related to a browser application may include details such as, but not limited to, a type of browser (Internet Explorer, Safari, Chrome, Firefox, etc.), web addresses of webpages being accessed or last accessed using the browser, web history of webpages accessed for a certain time period, timestamp information regarding the accessed webpage(s), cookie information, search query(-ies) submitted using a search engine, presentation format of a last webpage visited (e.g., webpage position information in terms of percentage of webpage scrolled on a certain browser on a certain device screen, and font type, font size, font color, etc. of the webpage text), a type of user device executing the browser (desktop, tablet, etc.), and a type of operating system of the user device. Details related to recorded user activity and collected states for applications other than a browser application may include similar content-related and content presentation-related information.

In some implementations, the techniques of continued application sessions include associating each application session, which is tracked (e.g., at device 105), stored (e.g., at server 120), and requested for continuation (e.g., from device 110), with a certain user identity of a certain user who is engaged with devices 105, 110 and server 120. In that regard, a user may need to create an account at session continuation server 120, e.g., with a specific username and password (and/or other credentials) that are stored at server 120. In some implementations, if the user (at device 105) wants to have the session information for one or more applications tracked, collected and stored (at server 120) so that the user may be able to later retrieve the session information to continue the application session at another device 110 (or another instance of the application), the user may first need to log-in into the account at server 120 (via device 105/110) using valid preset credentials.

Upon successful login, server 120 may notify devices 105, 110 that appropriately configured applications (e.g., applications 106, 111) may begin to collect and transmit session information to server 120 for processing and storage, and/or may request the stored session information to load a previous application session. Session continuation server 120 may be configured to store session information in a database under specific user profiles for the users who are logged-in at device 105 or device 110 at the time of interacting with respective applications 106, 111.

In some implementations, when the user logs into applications 106, 111, the user may be able to view stored information regarding other devices with corresponding applications associated with the same user account. The information about other devices that the user may view includes the device type of the other device and/or the device name. The device name may have been specified by the user (when creating the account at server 120), and in the case that a user has multiple devices of the same type (e.g., multiple desktop computers), the device name will be used to differentiate the devices. On each device 105, 110, the viewable information may include viewed pages, browser history, search query history and/or other application-specific user activity information. Based on the session information received from server 120, the user may load on device 110 the last webpage visited on device 105 when the same user was logged-in at device 105 with his/her account credentials. In addition to, or instead of, loading the last webpage, the user may view and load the last search query from device 105 on device 110.

In some implementations, applications 106, 111 are custom developed applications for a desktop computer, a tablet device, a mobile device, a gaming machine, and/or a television. Applications 106, 111 may be in the form of a browser plugin/extension, a TV widget, and/or a fully functional web browser application. Each version of applications 106, 111 may be adapted to display or provide content (e.g., webpages, etc.) in a manner compatible with the device 105, 110 on which the application is installed. Thus, application 106, 111 may adapt the content viewed to different screen sizes and aspect ratios, and input methods as required by the corresponding device.

In some embodiments, the user that owns, for example, devices 105, 110, can move between these devices and synchronize previous application states (e.g., browsing sessions) between the devices. For example, the user can begin a browsing session on the mobile phone 105, and upon arrival at a work location, continue the browsing session on a work computer 110 (or vice-versa). The synchronization of the browsing session on using session continuation server 120 allows the user to maintain an effective single browsing session (e.g., with a same URL and webpage position information) across multiple devices in multiple locations.

Figure 2A:
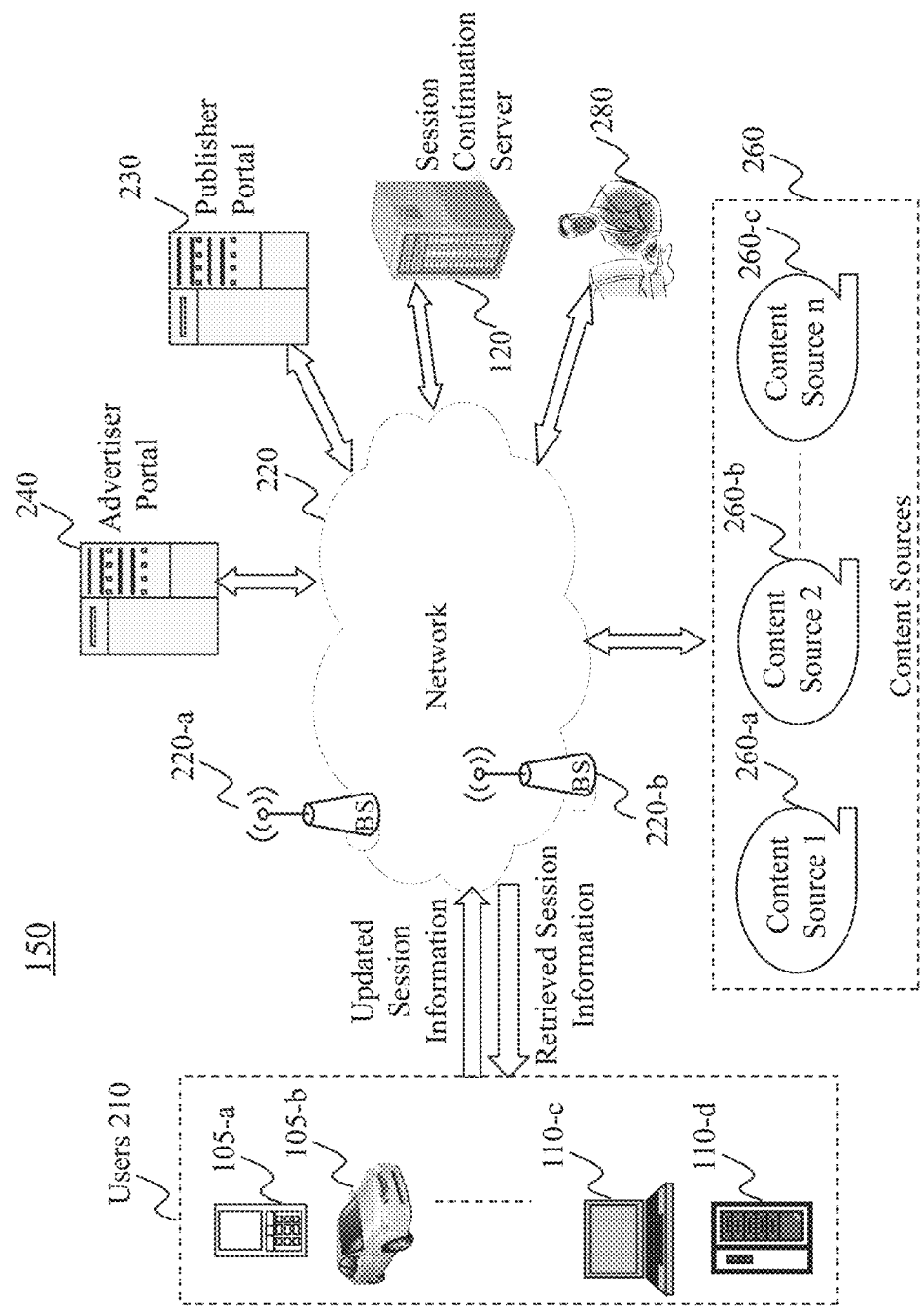
FIGS. 2(a), 2(b) illustrate examples of systems in which the session continuation techniques are implemented in accordance with various embodiments of the present disclosure.
Figure 2B:
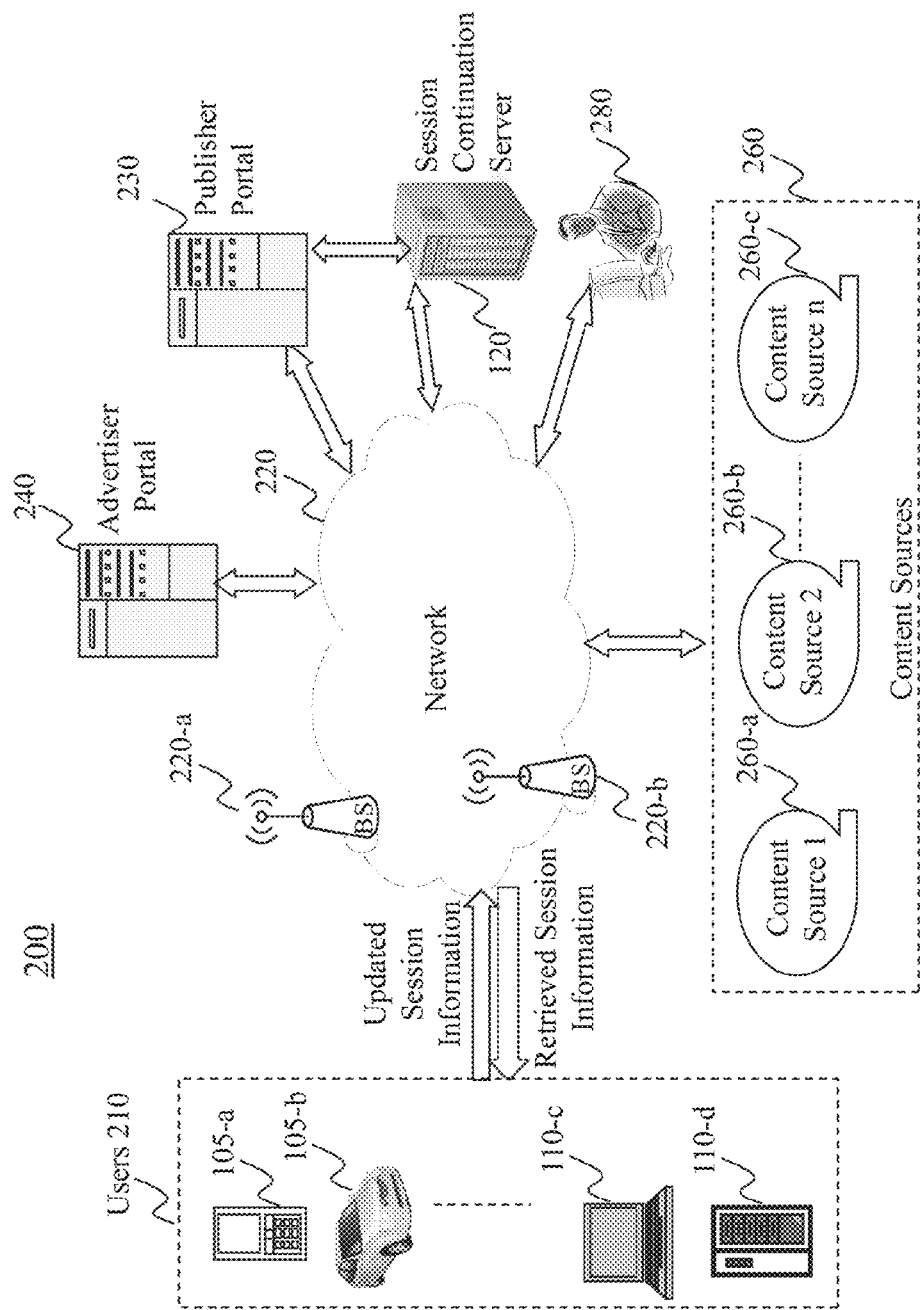

FIGS. 2(a), 2(b) are high level depiction of different system configurations in which one or more application session continuation techniques may be implemented, according to one or more embodiments of the present disclosure. In FIG. 2(a), the exemplary system 150 includes users 210 (e.g., which use devices 105, 110), a network 220, one or more publisher portals or publishers (or content providers) 230, one or more advertisers 240, a session continuation server 120, content sources 260 including content source 1 260-a, content source 2 260-b, . . . , content source n 260-c, and a system operator/administrator 280.

Session continuation server 120 may allow applications 106, 111 at devices 105, 110 of users 210 to store and synchronize the session information for one or more sessions of applications 106, 111 on those devices to one another. In some embodiments, server 120 receives and stores session information from a user device with regard to a session of a certain application being executed on the user device and accessed by a certain user (with certain user identity). In some embodiments, server 120 receives and responds to a request based on a pre-defined URL accessed from another user device (operated by the user with the same user identity) to continue the application session on the other device. In that regard, server 120, in association with appropriate publisher(s) 230, provides the session information and the content related to the session information to the other device for a continued session of the application. In some embodiments, the applications of devices 105, 110 may communicate directly with server 120 to synchronize the application sessions independent of publishers 230.

The network 220 may be a single network or a combination of different networks. For example, a network may be a local area network (LAN), a wide area network (WAN), a public network, a private network, a proprietary network, a Public Telephone Switched Network (PSTN), the Internet, a wireless network, a cellular network, a virtual network, or any combination thereof. A network may also include various network access points, e.g., wired or wireless access points such as base stations or Internet exchange points 220-a, . . . , 220-b, through which a data source may connect to the network in order to transmit information via the network. In one embodiment, network 220 may be an online advertising network or an ad network, which connects advertisers 240 to publishers 230 or websites/mobile applications that want to host advertisements. A function of an ad network is aggregation of ad-space supply from publishers and matching it with advertiser demand. An ad network may be a television ad network, a print ad network, an online (Internet) ad network, or a mobile ad network.

Users 210 may be of different types such as users connected to the network via devices 105, 110 discussed above, e.g., including desktop connections (110-d), users connecting to network 220 via wireless connections such as through a laptop (110-c), a handheld device (105-a), or a built-in device in a motor vehicle (105-b). In one embodiment, user(s) 210 may be connected to network 220 and able to access and interact with online content (provided by the publishers 230) through wireless technologies and related operating systems and interfaces implemented within user-wearable devices (e.g., glasses, wrist watch, etc.). A user, e.g., operating device 105-a, may send a request for online content (e.g., a webpage) and/or a search query to publisher 230, via network 220 and receive content as well as one or more advertisements/ads (provided by advertiser 240) through network 220. The online content and ads may be provided and rendered on (e.g., a display of) user device 105-a with a specific UI layout having multiple different UI elements (e.g., font size, font color, background color, etc.) with certain pre-configured values. The user at device 105-a may click on or otherwise interact with the content and/or select the ad(s) to review and/or purchase the advertised products) or service(s). In the context of the present disclosure, details about the presented content (e.g., URL, position, etc.) in a certain application session for a certain user may be collected and sent from the device to server 120 for processing, synchronization, and storage.

In some embodiments, each user 210 may be required to create an online/web account at session continuation server 120 (with unique log-in credentials) to utilize the session continuation/synchronization services provided by server 120. Accordingly, if user 210 wants to have the session information for one or more applications at device 105 tracked, collected and stored (at server 120) so that user 210 may be able to later retrieve the session information to continue the application session at another device 110 (or another instance of the application at device 105), user 210 may first need to log-in into the account at server 120 using valid preset credentials. Upon successful login, server 120 may notify user 210 at their device that the installed applications (e.g., browsers, e-mail client applications, mobile apps, etc.) may begin to collect and transmit session information to server 120 for processing and storage, and/or may request the stored session information to load a previous application session. All the new session information or updates to the session information may be stored at a database associated with session continuation server 120, where the database stores the session information under a unique "user profile" created for each user 210 (or one unique identity of user 210). In other words, the session information stored in session continuation server 120 (or a database thereof) may be indexed based on the unique user identities of users 210, and as such, the session information may be sorted, updated or retrieved with respect to (or in direct relation to) the unique user identities of users 210.

Publishers 230, may correspond to an entity, whether an individual, a firm, or an organization, having publishing business, such as a television station, a newspaper issuer, a web page host, an online service provider, or a game server. For example, in connection to an online or mobile ad network, publishers 230 may be an organization such as USPTO.gov, a content provider such as CNN.com and Yahoo.com, or a content-feed source such as Twitter or blogs. In one embodiment, publishers 230 include entities that develop, support and/or provide online content via mobile applications (e.g., installed on smartphones, tablet devices, etc.). In one example, the content sent to devices 105, 110 for users 210 may be generated or formatted by publishers 230 based on data provided by or retrieved from content sources 260. A content source may correspond to an entity where the content was originally generated and/or stored. For example, a novel may be originally printed in a magazine, but then posted online at a web site controlled by a publisher. The content sources 260 in the exemplary networked environment 150 include multiple content sources 260-1, 260-2 . . . 260-3.

The online content (including ads) provided by the publishers 230 is associated with a number of UI elements that define the overall presentation of the online content on the user device 110. For example, the UI elements related to websites, webpages or apps include, but not limited to, font size, font style, font color, bold (or other emphasis) on certain portions of text, page layout, background color, background images, border color, border style, border size, "mouse over" behavior, icon/button arrangements, icon/button size, icon/button shape, menu color, length of text of search results, length of each field, truncation/shortening rules, animation/multimedia effects and image/thumbnail placement rules.

Advertisers 240, generally, may correspond to an entity, whether an individual, a firm, or an organization, doing or planning to do (or otherwise involved in) advertising business. As such, an advertiser 240 may be an entity that provides product(s) and/or service(s), and itself handles the advertising process for its own product(s) and/or service(s) at a platform (e.g., websites, mobile applications, etc.) provided by a publisher. For example, advertisers 240 may include companies like General Motors, Best Buy, or Disney. In some other cases, however, an advertiser 240 may be an entity that only handles the advertising process for product(s) and/or service(s) provided by another entity.

Advertisers 240 may be entities that are arranged to provide online advertisements to publisher(s) 230, such that those advertisements are presented to the user 210 with other online content at the user device. Advertisers 240 may provide streaming content, static content, and sponsored content. Advertising content may be placed at any location on a content page or mobile app, and may be presented both as part of a content stream as well as a standalone advertisement, placed strategically around or within the content stream. In some embodiments, advertisers 240 may include or may be configured as an ad exchange engine that serves as a platform for buying one or more advertisement opportunities made available by a publisher (e.g., publisher 230). The ad exchange engine may run an internal bidding among multiple advertisers associated with the engine, and submit a suitable bid to the publisher, after receiving and in response to a bid request from the publisher.

The content sources 260 may include multiple content sources 260-a, 260-b, . . . , 260-n. A content source may correspond to a web page/app host corresponding to a publisher (e.g., publisher 230) an entity, whether an individual, a business, or an organization such as USPTO.gov, a content provider such as CNN.com and Yahoo.com, or content feed source such as Twitter or blogs. Content sources 260 may be any source of online content such as online news, published papers, blogs, on-line tabloids, magazines, audio content, image content, and video content. It may be content from a content provider such as Yahoo! Finance, Yahoo! Sports, CNN, and ESPN. It may be multi-media content or text or any other form of content comprised of website content, social media content, such as Facebook, Twitter, Reddit, etc., or any other content rich provider. It may be licensed content from providers such as AP and Reuters. It may also be content crawled and indexed from various sources on the Internet. Content sources 260 provide a vast array of content to publishers 230 and/or other parts of system 150.

In some implementations, a different type of user such as user 280, which may be a system operator or an administrator, may also be able to interact with different components of system 200 for different administrative jobs such as managing the server 120, etc. In some embodiments, user 280 may be classified to have a higher privilege to manage server 120 on more operational issues than user 210. For example, user 280 may be configured to be able to update the indexing scheme or format of data stored in a database of server 120, and the format of data received from devices 105, 110. In some embodiments, server 120 may be part of a third party service provider so that the publishers 230 and advertisers 240 may be customers of server 120.

FIG. 2(b) presents a similar system configuration 200 as what is shown in FIG. 2(a), except that publishers 230 are directly connected to server 120. It is noted that different configurations as illustrated in FIGS. 2(a), 2(b) may also be mixed in any manner that is appropriate for a particular application scenario. For example, in some embodiments, publishers 230, advertisers 240, and users 210 may be connected (directly or via the network 220) to a database connected to server 120, which maintains and updates users' account information with respect to access and activation of services provided by session continuation server 120. Further, in some embodiments, one or more functionalities and configurations of server 120 may integrated within a publisher 230, such that publisher 230 may provide the session continuation service for its own users as well as be able to provide the session continuation service to other publishers 230 and/or advertisers 240.

Referring to FIG. 3, which illustrates a high level depiction of an exemplary session continuation server 120, according to an embodiment of the present disclosure. As shown, session continuation server 120 may include a communication platform 310, a session information storage unit 320 (or storage unit 125), a user account management unit 330, an authentication unit 340, a session-information receiving unit 350, a session-information transmission unit 360, and/or other components and units.

Communication platform 310 may be configured as a data interface for server 120 to networks, devices, and other components of a system where the present teachings are implemented. For example, communication platform 310 may be configured to receive user account information, log-in credentials, session information, requests for session information, etc., e.g., from device(s) 105, 110, and transmit user authentication confirmation, session information, content (from publishers 230, advertisers 240, etc.) etc., e.g., to device(s) 105, 110. For such information reception and transmission, communication platform 310 may be configured in accordance with one or more network protocols (e.g., TCP/IP, etc.) and/or one or more communication protocols (e.g., wireless protocols, such as CDMA, LTE, etc.).

Figure 4:
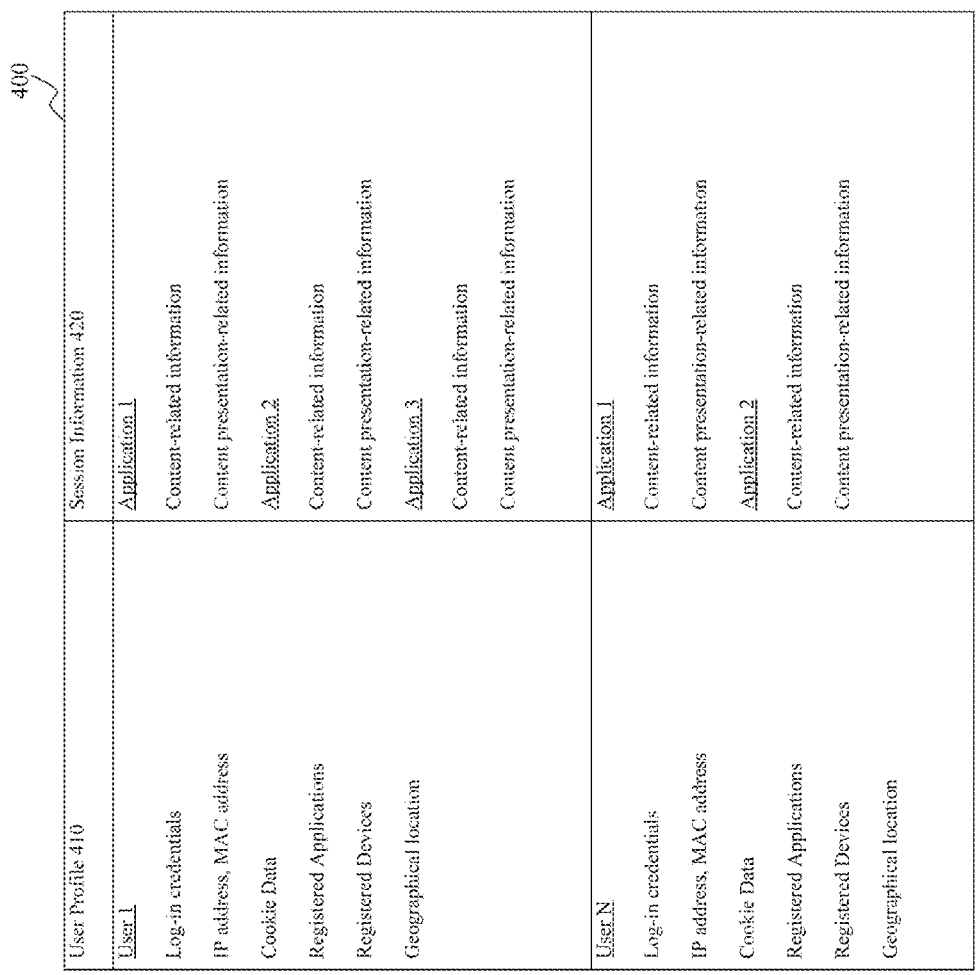
FIG. 4 illustrates an example of a data structure at a storage unit of the session continuation server, in accordance with various embodiments of the present disclosure.

Session information storage unit 320 may format and store user account data and session information in relation to (or in a form which is arranged around) a specific entity of system 100. For example, session information storage unit 320 may store data as "user-centric," in which the storage unit 320 may create a table structure 400, as shown in FIG. 4. Table structure 400 include profiles 410 for each user 105, 110 (or for each known identity of user 105, 110), referenced as "user 1" "user 2," etc., and each profile 410 includes or is associated with corresponding user's authentication credentials (used to access services provided by server 120) and other user data such as, e.g., possible IP addresses of devices used by the user, types of devices associated with the user, types of applications installed on the user devices, etc.

Each user profile 410 may also include or be associated with session information 420 for each individual application (e.g., application 106, 111) that the user interacts with on their device(s) 105, 110 and that is configured to be tracked for session continuation service by server 120. Each user profile 410 may include a separate record (e.g., a sub-table structure) to store session information for one application or for one type of application. The session information of such individual application (e.g., a web browser application) may be include (a) content-related information of an application session, e.g., URL of the webpage last accessed in the session, timestamp information of when the last webpage was accessed, search activity such as queries with timestamps, bookmarks with the webpage and description etc.; and (b) content-presentation-related information of the (same) application session, e.g., amount or percentage of webpage scrolled in a web browser, amount or percentage of a document scrolled in a word processing application, font-related details (size, type, color, etc.), size of the application window, cursor/mouse position (defined using x/y coordinates), and geo location information of the user or device (either received directly from the device or inferred via the device's IP address), etc.

In this form, session information for any application used by a certain user at one or more user devices 105, 110 may be tracked, maintained, updated, retrieved and provided from their respective user profiles 410 in session information storage unit 320. In some embodiments, session information storage unit 320 is operatively associated with user account management unit 330 and an authentication unit 340 to enable creation of new user accounts and authenticating whether incoming user credentials are valid to access server 120. Session information storage unit 320 may also be operatively associated with session-information receiving unit 350, and session-information transmission unit 360 to receive, update and provide session information to/from the user devices in the manner discussed above.

As discussed above, the session continuation techniques described in the present disclosure may be based on individual user accounts or profiles for the users who want to utilize the session-continuation services. In that regard, user account management unit 330 is configured to create and maintain user accounts for individual users (or types of users) who wish to utilize the service of having their application sessions saved for future revival on a different device (or the same device). Each new user account created at user account management unit 330 is associated with specific user identity credentials (e.g., a unique username-password pair), and is stored as one user profile 410 in storage unit 320. Further, user account management unit 330 may also associate each user account with specific details about the applications (e.g., 106, 111) that the user wishes to register for session-tracking-and-continuation features in accordance with the present disclosure.

Figure 5:
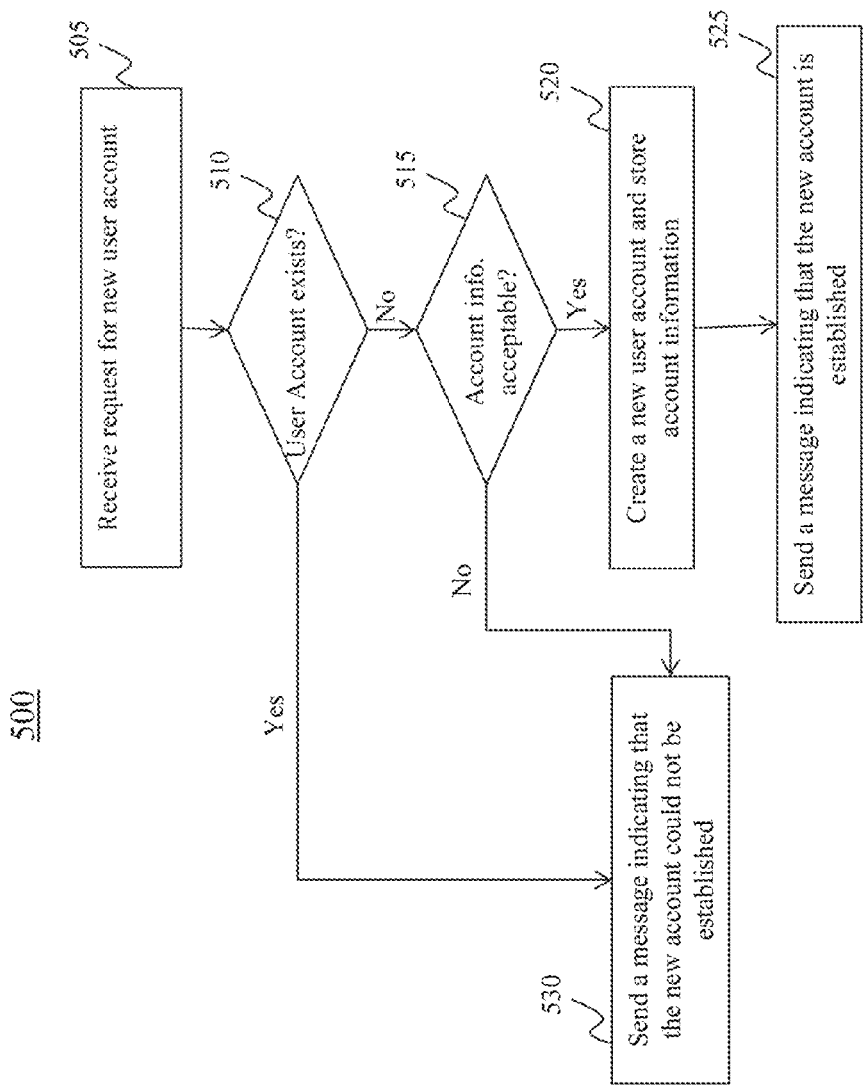
FIG. 5 is a flowchart of an exemplary process for setting up a new user account, in accordance with various embodiments of the present disclosure.

FIG. 5 depicts a flow chart for a method 500 for session continuation server 120 to set up a new user account using user account management unit 330, according to an embodiment of the present disclosure. In method 500, at operation 505, session continuation server 120 receives a request (e.g., at communication platform 310) for a new user account from a device 105, 110 (via an application thereon) operated by a user 210. The user-account creation request may include user identity credentials chosen by the user (e.g., a username-password pair). The user-account creation request may also include details (e.g., name, developer, functions, type, etc.) about the application(s) that the user wishes to register for session-tracking-and-continuation purposes at server 120. The request may be provided to user account management unit 330 for further processing.

At operation 510, user account management unit 330 determines whether the user account already exists, e.g., based on the information provided in the request and comparing it with information in storage unit 320. If the user account already exists (in storage unit 320), method 500 proceeds to operation 530. If the user account does not exist (in storage unit 320), method 500 proceeds to operation 515.

At operation 515, user account management unit 330 determines whether the account information in the request (e.g., the username-password pair) is acceptable for the purposes of creating a valid user account. If the account information is acceptable, method 500 proceeds to operation 520. If the account information is not acceptable, method 500 proceeds to operation 530. For example, the account information might not be acceptable because the username and/or the password is too short, too long, or includes characters or strings of characters that are not acceptable. At operation 520, user account management unit 330 creates a new account based on the received account information, and stores the account information, e.g., as a record in table structure 400 at storage unit 320. At operation 525, user account management unit 330 sends a message indicating that the new account is established to the user device that sent the account request. Alternatively, at operation 530, user account management unit 330 sends a message to the user device indicating that the new account could not be established.

User account management unit 330 may be further configured to delete, change or update the existing user accounts and information stored therein, e.g., in response to corresponding requests from the user. User account management unit 330 may also group or tag various user accounts (stored at storage unit 320) based on one or more characteristics of those user accounts, e.g., based on a type of device (laptop, smartphone, etc.), a type of operating system on the device (Windows, Android, etc.), a type and/or a number of applications the users have registered at server 120, geographical location of the users, etc.

Authentication unit 340 (depicted in FIG. 3) may authenticate a user to determine whether the user is allowed to access session continuation server 120 for the purposes of recording or retrieving session information for one or more applications at one or more devices. For example, before a user at a device (105 or 110) begins an application session the session information of which the user wishes to store at or retrieve from server 120, the user may be required to log-in and get authenticate by authentication unit 340 of server 120. To begin the log-in and authentication process, the user may first provide the user credentials (e.g., the username-password pair established at the time of account creation) to server 120. The credentials may be received at communication platform 310, and forwarded to authentication unit 340 for further processing and validation. Authentication unit 340 may then communicate with storage unit 320 to search, extract or compare the user credentials with the user account information stored in storage unit 320. Based on the comparison with the stored user account information, authentication unit 340 may determine whether the requesting user is authorized to access server 120 (or services thereof).

Figure 6:
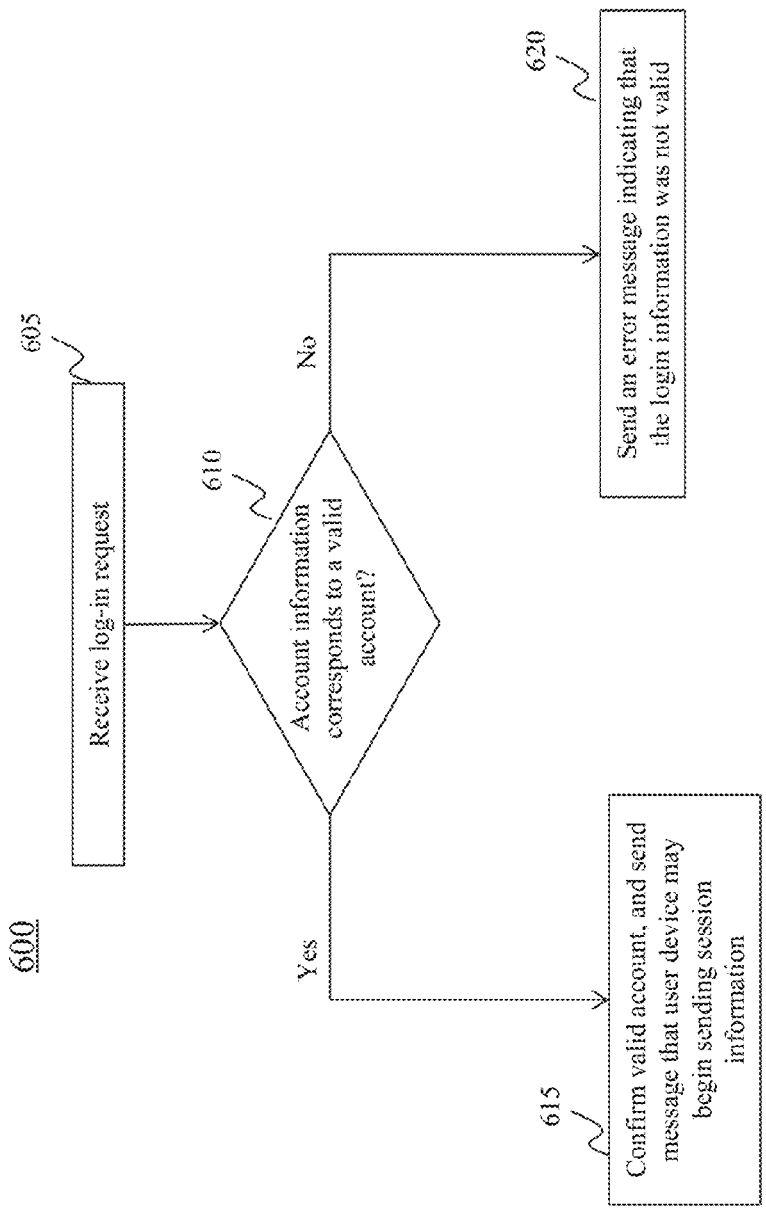
FIG. 6 is a flowchart of an exemplary process for validating user credentials at the session continuation server, in accordance with various embodiments of the present disclosure.

FIG. 6 depicts a flow chart for a method 600 for authentication unit 340 to validate user credentials to log-in a user at server 120, according to an embodiment of the present disclosure. Method 600 begins at operation 605 where authentication unit 340 receives a request for login from a user device 105, 110 being operated by a certain user. The login information may include username/user ID and password, or any other information (biometric information, etc.) pre-established by account management unit 330 during account creation for the user.

At operation 610, authentication unit 340 determines whether the account information corresponds to a valid account, e.g., based on comparison with pre-stored account information from storage unit 320. If the account information corresponds to a valid account, the method proceeds to operation 615. If the account information does not correspond to a valid account, the method proceeds to operation 620.

At operation 615, authentication unit 340 may generate and send (via communication platform 310) to the user device a confirmation message that the application(s) at the user device may begin sending session information for one or more sessions to server 120 for storage for session continuation purposes at a later time, or begin requesting session information to load one or more previous sessions at the user device. In other words, at operation 615, for example, authentication unit 340 allows application(s) 106 at device 105 to send activity updates to session continuation server 120 for storage, and application(s) 111 to make requests for loading and continuing a last session of application(s) 106 now at device 110.

At operation 620, authentication unit 340 may generate and send (via communication platform 310) to the user device an error message indicating that the login information was not valid and may offer the user suggestions or help for logging into server 120.

Referring back to FIG. 3, session-information receiving unit 350 may receive (via communication platform 310) new or updated session information about one or more sessions of one or more applications operated by certain users (each of which have unique user identification credentials and corresponding user profiles 410). Session-information receiving unit 350 may process and provide the received session information for storage at storage unit 120, e.g., in association with appropriate user profile 410. For example, session-information receiving unit 350 may determine whether the received session information (e.g., last access webpage URL, position of the webpage, etc.) relates to a new session of application 106, or is an update regarding an existing or ongoing session of application 106. Based on such determination, session-information receiving unit 350 may add or update data (URL, position, etc.) for application 106 within the appropriate user profile 410.

Based on the received session information, session-information receiving unit 350 may determine specific details about the user 210 who is interacting with the application for which the session information is received and/or details about the user device 105, 110 which sent the session information. The session information may further include, for example, a MAC address of the user device, an IP address of the device, or any other identifier related to the device.

Figure 7:
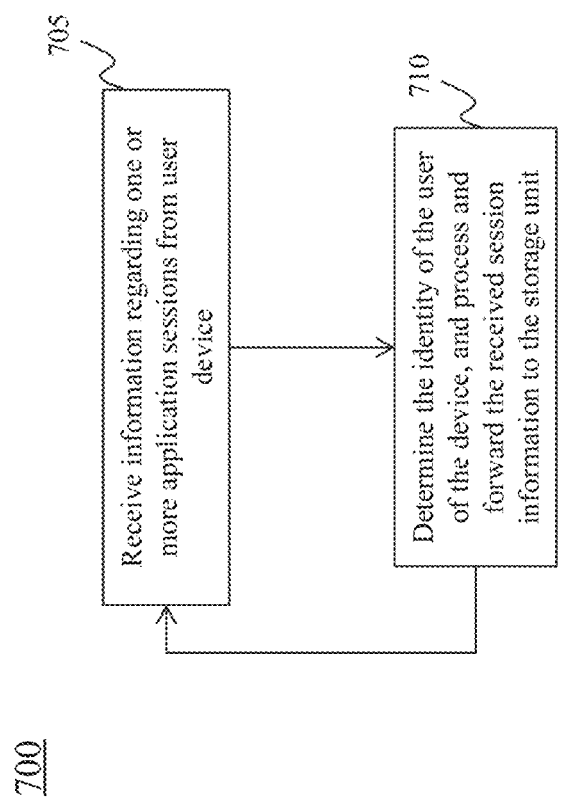
FIG. 7 is a flowchart of an exemplary process to receive and process session information at the session continuation server, in accordance with various embodiments of the present disclosure.

FIG. 7 depicts a flow chart for a method 700 for session-information receiving unit 350 to receive and process session information, according to an embodiment of the present teaching. Method 700 begins at operation 705, in which session-information receiving unit 350 receives information regarding one or more application sessions (e.g., browser session(s)) from device 105 operated by a certain user 210. At operation 710, session-information receiving unit 350 (e.g., in conjunction with authentication unit 34) determines the identity of the certain user of device 105, and processes and forwards the received session information to storage unit 320 for newly recording or updating the information under the user profile 410 of the certain user 210. Once the received session information has been properly stored, method 700 repeats from operation 705 every time there is new or updated session information for new or updated application sessions.

Figure 8:
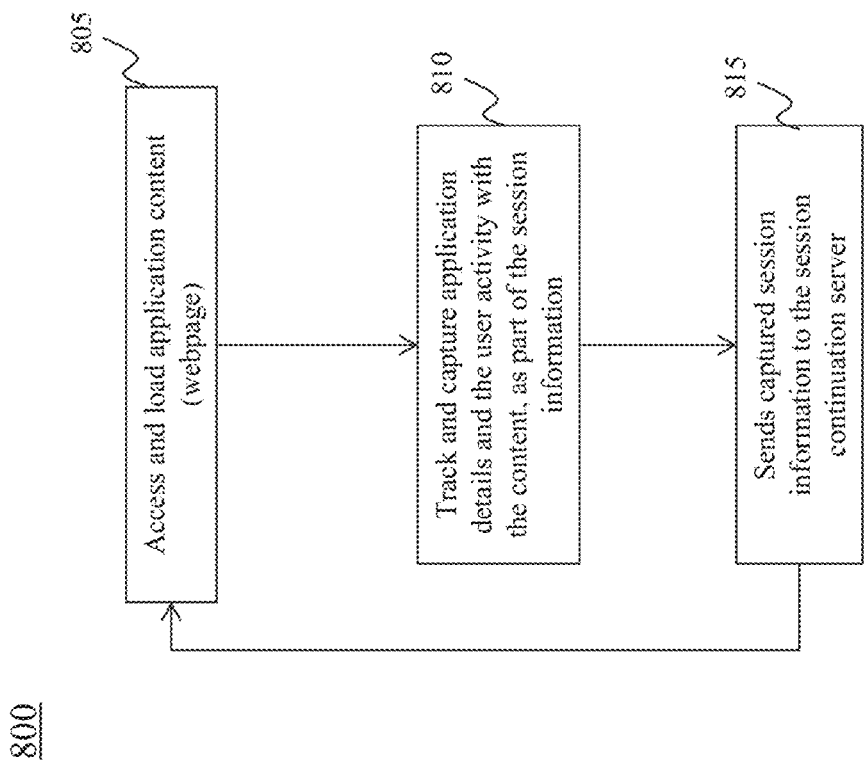
FIG. 8 is a flowchart of an exemplary process to send session information from a user device for storing at the session continuation server, in accordance with various embodiments of the present disclosure.

FIG. 8 depicts a flow chart for a method 800 of sending session information from a user device for storage at server 120, according to an embodiment of the present teaching. Method 800 may be performed continuously as a user (who has already successfully logged into server 120 from device 105) uses or interacts with one or more sessions of one or more applications 106. If server 120 is not available (e.g., due to network problems, etc.), application 106 (or the JavaScript embedded therein) may continue to store the session information locally in a storage unit of device 105, until server 120 becomes available. When server 120 is available, the session information stored at device 105 is transferred to server 120 (e.g., to unit 350).

Method 800 begins at operation 805, in which the user may access and load a webpage on web browser 106. The user may interact with the webpage content provided by web browser 106, e.g., the user may conduct a search, stream audio or video files, or any other activity. At operation 810, application 106 tracks and captures the webpage details and the user activity as part of the session information. At operation 815, application 106 (or the JavaScript embedded therein) sends the session information to the server 120 for storage. Method 800 may repeat from operation 805 for a new session or when there is an update to an existing session.

Referring back to FIG. 3, session-information transmission unit 360 may (a) receive requests (via communication platform 310) from application(s) 111 on device(s) 110 where a certain user wishes to continue one or more sessions of one or more applications 106, and (b) transmit appropriate session information (and/or related content) to device(s) 110 responsive to the requests. In some embodiments, the requests from device(s) 110 may be made by the user accessing a pre-defined URL ("last.yahoo.com") related or assigned to session continuation server 120, e.g., accessing the URL in a browser by typing the URL in the browser bar, clicking on a bookmark made for that URL, activating a "launcher" app that accesses the URL in the background (without using a browser) and/or by other means to access the URL.

By accessing the pre-defined URL, device(s) 110 may indicate to session continuation server 120 that device(s) 110 wishes to make a connection with server 120 solely for the purposes of retrieving session information. In some embodiments, the requests from application(s) 111 may be for session information of the state of application(s) 106 during their last session(s) when the user was using device(s) 105. The requests may include information identifying application(s) 111, application(s) 106, device(s) 110, device(s) 105, user attributes, etc. Based on the session information, the same sessions may be revived and presented to the user on device 110 with the same content and in the same presentation format as in the last session(s) on device(s) 105.

In some embodiments, before session-information transmission unit 360 receives requests for session information from device(s) 110, the user at device 110 may be required to log into and authenticate herself with server 120 (e.g., in accordance with operations of authentication unit 340). Once the user is successfully logged-in at server 120 from requesting device 110, session-information transmission unit 360 may be able to determine the identity of the user who is operating device 110. Accordingly, when determining appropriate session information to retrieve from storage unit 320 for transmission to device 110, session-information transmission unit 360 may identify and access a correct user profile 410 that relates to the identified user.

Session-information transmission unit 360 may, responsive to the request from application 111 at device 110, provide the retrieved session information to communication platform 310 for transmission to requesting device 110. At device 110, session information received from server 120 is used to load and provide the same content (e.g., same webpage) and in the same presentation format (e.g., same scroll position on the webpage) as was collected for application 106 during its last session on device 105. As such, this presentation of content based on session information allows continuing the application session at device 110 from where it was left was on device 105. Applications 106, 111 may be similar in their functionality and features, but may be developed by different companies or service providers; for example, both applications 106, 111 may be web browsers, but of different kind, such as, Internet Explorer and Firefox.

Once application(s) 111 is configured using session information such that a previous application session can be continued, application(s) 111 may begin tracking and collecting session information based on user interactions with the continued session, and transferring the newly collected session information for recording at server 120. For example, in a continued browser session, once a webpage from previous browser session is loaded on browser 111 on device 110, the user may access and load a new webpage and/or scroll the webpage to change its position, and thus, start a new session of browser 111. Such new session information may be transmitted to server 120 for processing (by unit 350) and storing (at unit 320) in association with the appropriate user profile 410. As such, now if the user moves to a third device, the user may be able to continue the session from browser 111, e.g., by accessing the pre-defined URL and retrieving the updated browser session information.

Figure 9:
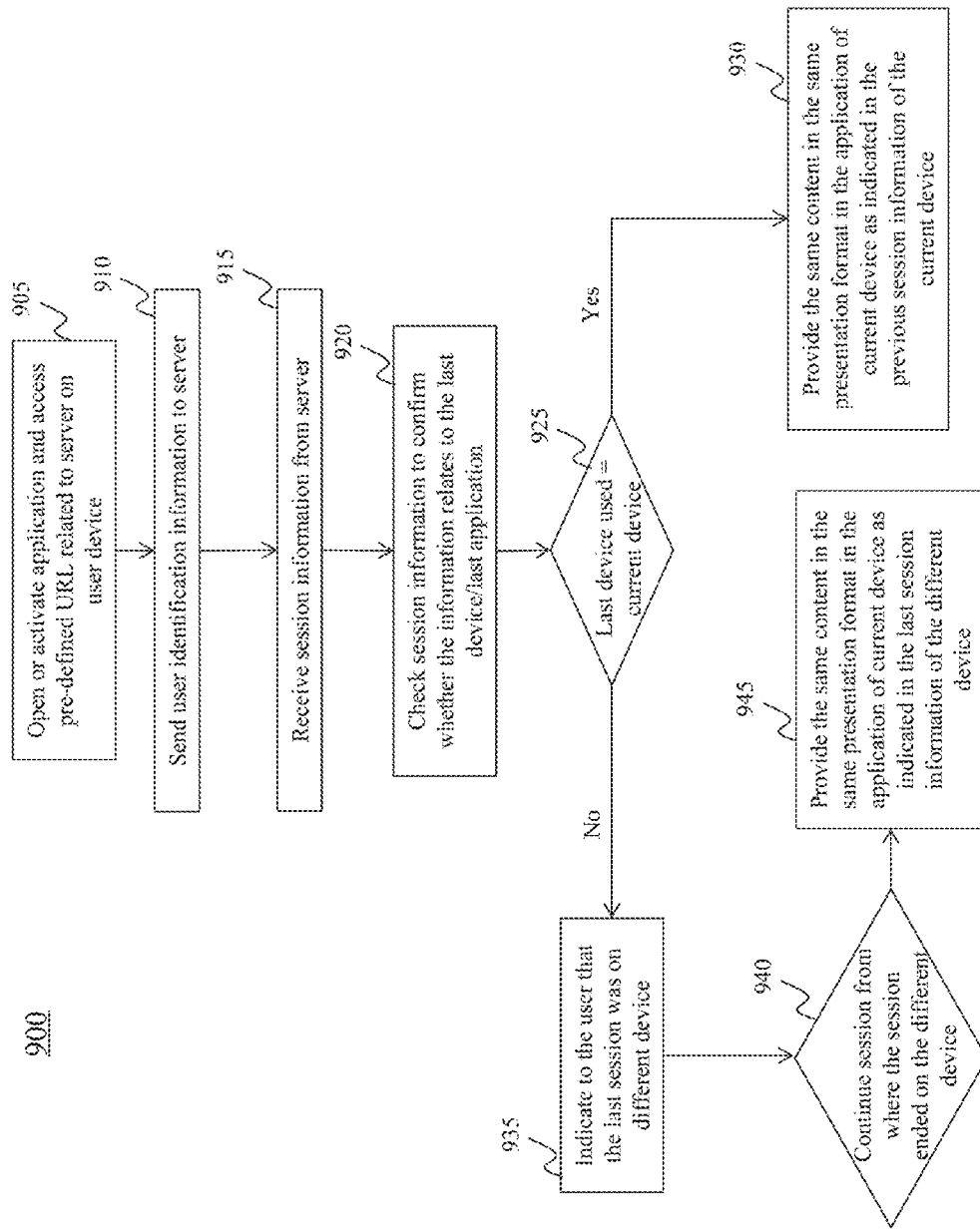
FIG. 9 is a flowchart of an exemplary process for an application at a user device to provide a continued application session, in accordance with various embodiments of the present disclosure.

FIG. 9 depicts a flow chart for a method 900 for an application to provide a continued application session, according to an embodiment of the present teaching. Method 900 begins at operation 905, in which a user opens application (e.g., browser) 111 on device 110. Application 111 may be opened and controlled in a similar manner to any other application on a computer, tablet, cell phone gaming machine or internet TV. For example from a menu, by pressing a button on a keyboard, remote control, by using voice commands, etc.

At operation 910, application 111 sends user identification information (e.g., username and password) to server 120. In some embodiments, e.g., at user device 110, the user identification information is exchanged for an access token, which is stored on user device 110. This token may be then used by the user device in place of the username and password pair for a predetermined length of time, e.g., to automatically log in the user at server 120. When that time period expires, the user is asked to re-enter their username and password to generate a new token.

At operation 915, application 111 receives session information from server 120, where the session information includes information for one or more last sessions of application (browser) 106 on device 105. The session information corresponds to information stored in the user profile 410 at storage unit 320.

At operation 920, application 111 checks (based on timestamps) the session information to confirm whether the information relates to the last device 105 and/or last application 106 that the user was using, so that only the latest session is being continued at device 110.

At operation 925, application 111 checks if the last device 105 used was the current device 110 (i.e., if devices 105, 110 is the same device). If the last device 105 used was the current device 110, the method proceeds to operation 930. If the last device 105 used was not the current device 110, the method proceeds to operation 935.

At operation 930, application 111 provides the same content (webpage) in the same presentation format (at the scroll position) as indicated in the session information, where the session information would indicate information about a previous session on the current device 110. At operation 935, application 111 indicates to the user that the last session was on another device 105 (different from device 110). At operation 940, application 111 asks the user if the user would like to continue the session from where a session ended on the different device 105. If the user wants to continue application session from where a browsing session ended on the different device 105, the method proceeds to operation 945. If the user does not want to continue from where a session ended on another device 105, the method proceeds to operation 930. At operation 945, application 111 is updated with the same content (e.g., same webpage) and in the same presentation format (e.g., same scroll position on the webpage) as was collected for application 106 during its last session on the different device 105.

Figure 10:
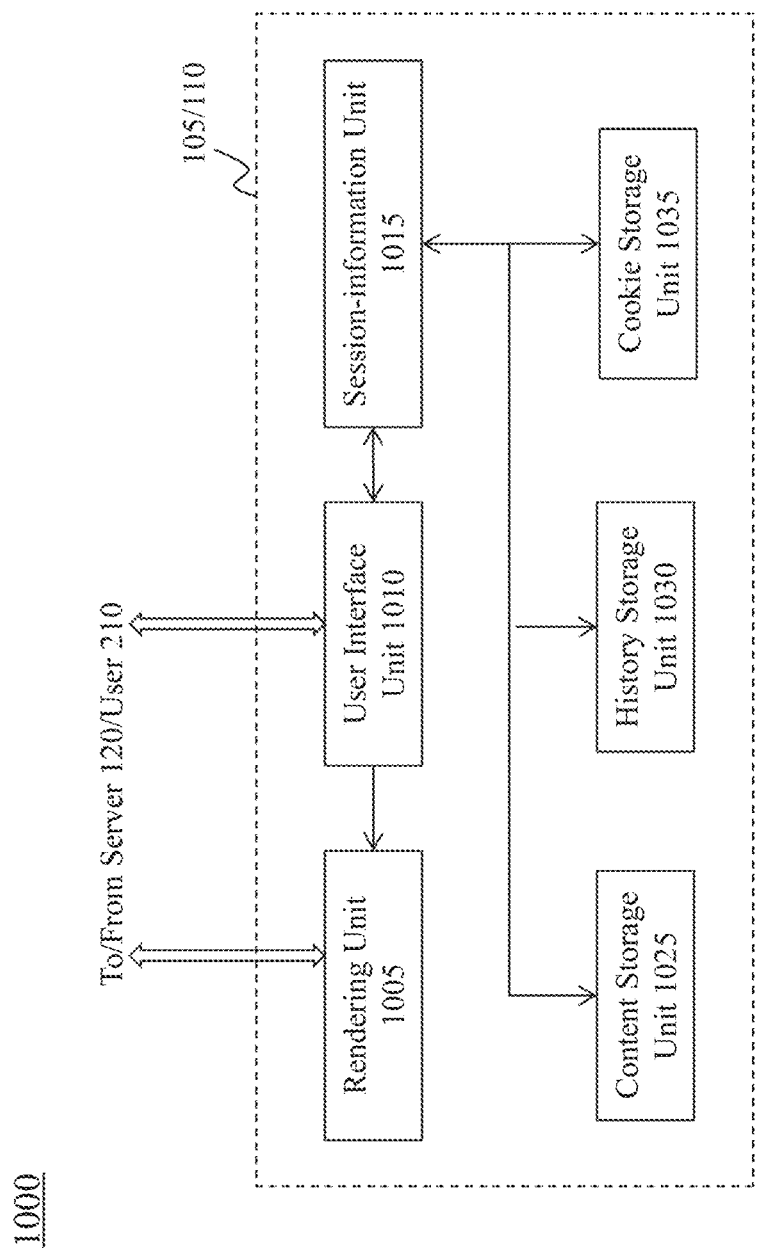
FIG. 10 illustrates an example of an application for which session is tracked and collected, in accordance with various embodiments of the present disclosure.

FIG. 10 depicts a device 105, 110 including an application 106, 111 (e.g., a browser) for seamless application sessions between devices, according to an embodiment of the present teaching. The depicted device may include a rendering unit 1005, a user interface unit 1010, a session unit 1015, a content store unit 1025, a history store 1030, and a cookie store 1035.

Rendering unit 1005 may convert webpages and searches received by the application into graphics that can be displayed on a screen of the device 105, 110. In some embodiments, rendering unit 1005 may make use graphics APIs already installed on the device, for example, in an operating system on the device. Rendering unit 1005 may be further adapted to display information in the device according to the device specification. Thus, rendering unit 905 may adapt webpages and other information to fit a larger or a smaller screen size, resolution, etc. than on other user devices.

User interface unit 1010 converts input from the user of the device into commands for the application. The input may be in the form of keyboard strokes, mouse, touch pad, or trackball motion, voice command and sound input, pictures, camera and video input, and input from other sensors such as acceleration, GPS, etc.

Content store unit 1025 may store webpages (or other application-specific content) viewed by the user so that the content viewed can be retrieved rapidly at a later instance. History store 1030 may store the URLs of webpages viewed by the user, so that the user can view those pages by searching the history of pages or by pushing a "back" button on the application (or performing an equivalent operation to the back button). Cookie store 1035 may store cookies associated with browsing activity.

Session unit 1015 may collect and send activity of the user on the application to server 120 for storage in storage unit 320 under the appropriate user profile 410. Session unit 1015 may send, for example, webpages (or their URLs) browsed with timestamps etc., search activity such as queries with timestamps, etc., bookmarks with the page and description etc., and the last session with status and timestamp, etc. Session unit 1015 may also connect to server 120 to retrieve the application session information that indicates the states of other similar applications registered to the user, if the user requests to view or load those previous states. Session unit 1015 may retrieve information from server 120, and add or update the information in content store 1025, history store 1030, and/or cookie store 1035 upon request from the user.

Figure 11:
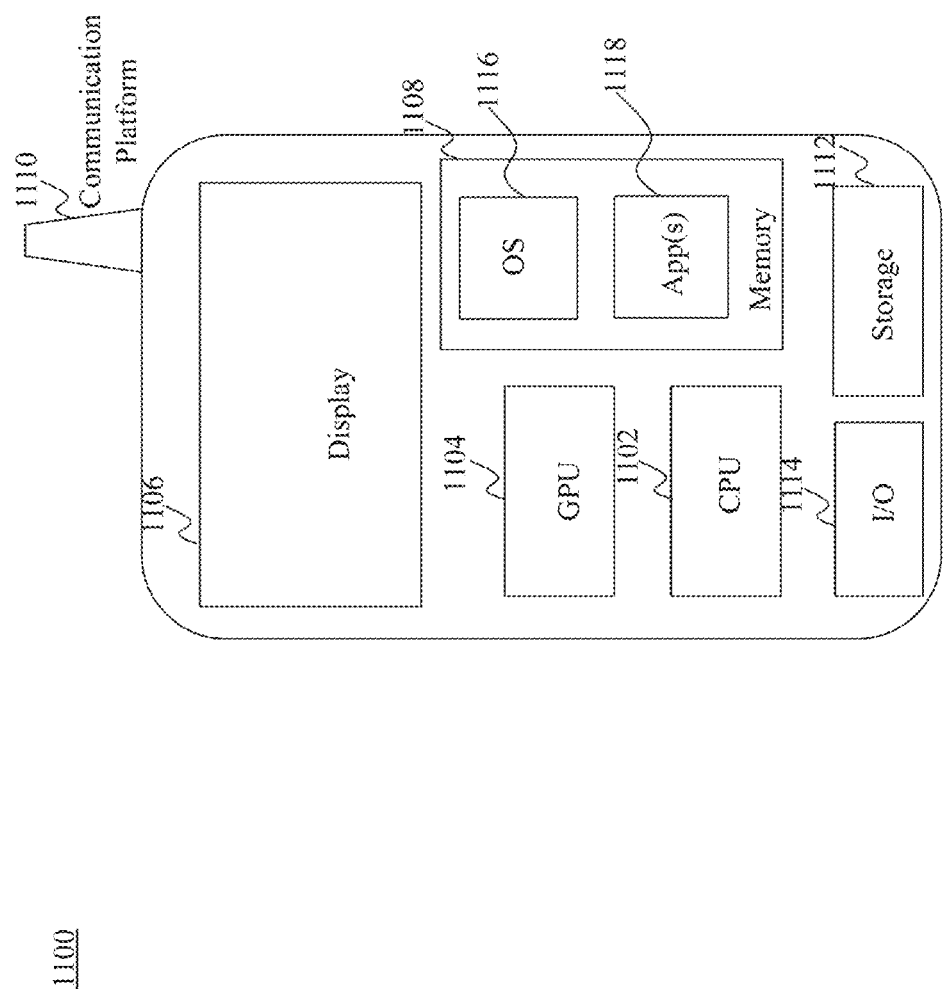
FIG. 11 depicts the architecture of a mobile device which can be used to implement a specialized system incorporating teachings of the present disclosure.

FIG. 11 depicts the architecture of a mobile device which can be used to realize a specialized system implementing the present teaching. In this example, the user device on which content and advertisement are presented and interacted-with is a mobile device 1100, including, but is not limited to, a smart phone, a tablet, a music player, a handled gaming console, a global positioning system (GPS) receiver, and a wearable computing device (e.g., eyeglasses, wrist watch, etc.), or in any other form factor. The mobile device 1100 in this example includes one or more central processing units (CPUs) 1102, one or more graphic processing units (GPUs) 1104, a display 1106, a memory 1108, a communication platform 1110, such as a wireless communication module, storage 1112, and one or more input/output (I/O) devices 1114. Any other suitable component, including but not limited to a system bus or a controller (not shown), may also be included in mobile device 1100. As shown in FIG. 11, a mobile operating system 1116, e.g., iOS, Android, Windows Phone, etc., and one or more applications 1118 may be loaded into memory 1108 from storage 1112 in order to be executed by CPU 1102. Applications 1118 may include a browser or any other suitable mobile apps for receiving and rendering content streams and advertisements on mobile device 1100. User interactions with the content streams and advertisements may be achieved via I/O devices 1114, and provided to session continuation server 120 and/or other components of system 100, e.g., via network 220.

To implement various modules, units, and their functionalities described in the present disclosure, computer hardware platforms may be used as the hardware platform(s) for one or more of the elements described herein (e.g., session continuation server 120 and/or other components of system 100 described with respect to FIGS. 1-10). The hardware elements, operating systems and programming languages of such computers are conventional in nature, and it is presumed that those skilled in the art are adequately familiar therewith to adapt those technologies to implement techniques for application session continuation, as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 12:
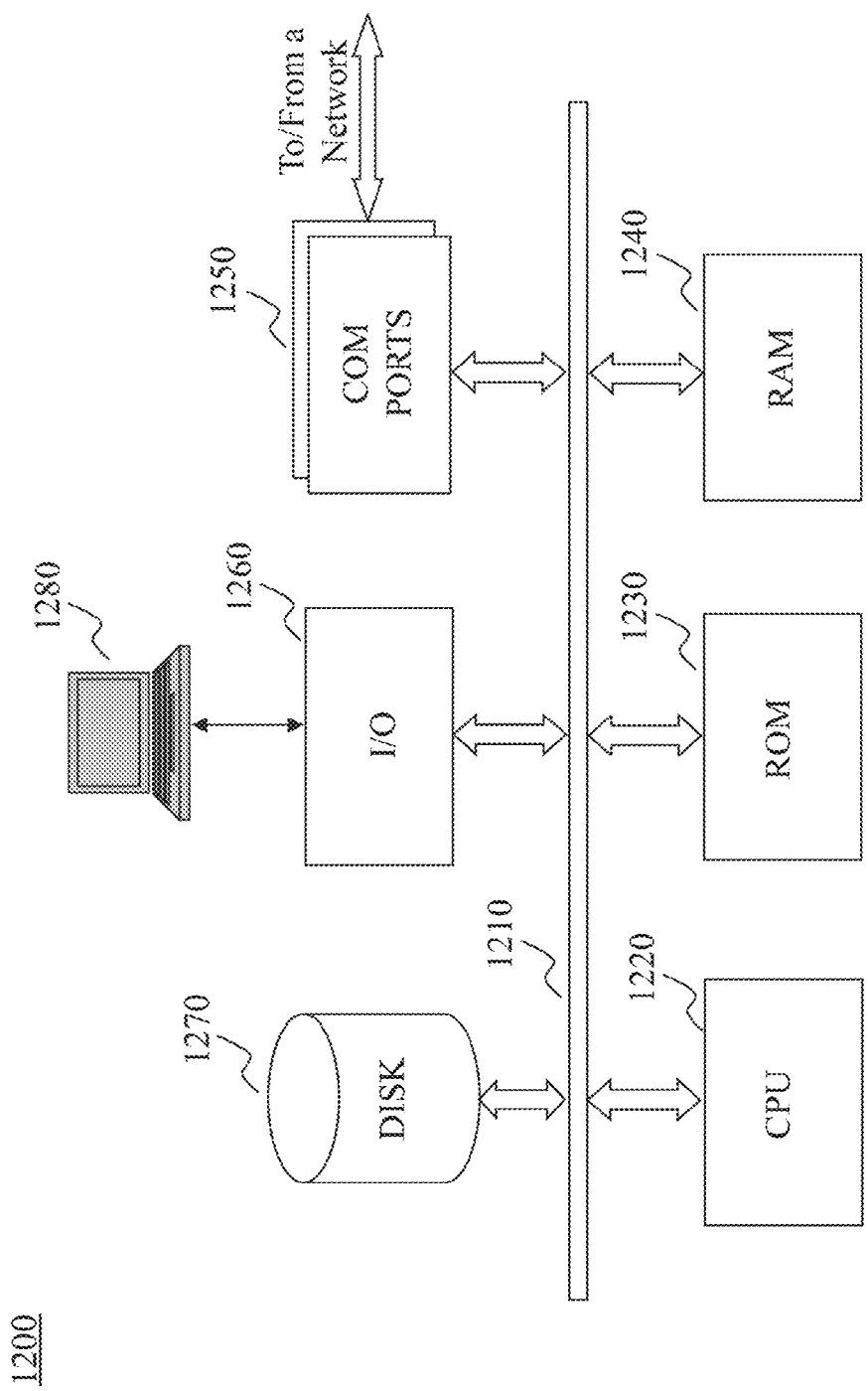
FIG. 12 depicts the architecture of a computer which can be used to implement a specialized system incorporating teachings of the present disclosure.

FIG. 12 depicts the architecture of a computing device which can be used to realize a specialized system implementing the present teaching. Such a specialized system incorporating the present teaching has a functional block diagram illustration of a hardware platform which includes user interface elements. The computer may be a general purpose computer or a special purpose computer. Both can be used to implement a specialized system for the present teaching. This computer 1200 may be used to implement any component of the session continuation techniques, as described herein. For example, session continuation server 120, etc., may be implemented on a computer such as computer 1200, via its hardware, software program, firmware, or a combination thereof. Although only one such computer is shown, for convenience, the computer functions relating to session continuation techniques as described herein may be implemented in a distributed fashion on a number of similar platforms, to distribute the processing load.

Computer 1200, for example, includes COM ports 1250 connected to and from a network connected thereto to facilitate data communications. Computer 1800 also includes a central processing unit (CPU) 1220, in the form of one or more processors, for executing program instructions. The exemplary computer platform includes an internal communication bus 1210, program storage and data storage of different forms, e.g., disk 1270, read only memory (ROM) 1230, or random access memory (RAM) 1240, for various data files to be processed and/or communicated by the computer, as well as possibly program instructions to be executed by the CPU. Computer 1200 also includes an I/O component 1260, supporting input/output flows between the computer and other components therein such as user interface elements 1280. Computer 1200 may also receive programming and data via network communications.

Hence, aspects of the methods of enhancing ad serving and/or other processes, as outlined above, may be embodied in programming Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of a search engine operator or other session continuation server into the hardware platform(s) of a computing environment or other system implementing a computing environment or similar functionalities in connection with continuation application sessions from one device to another device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the enhanced ad serving based on user curated native ads as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

I claim:

1. A method, implemented on a machine having a processor, storage, and a communication platform capable of making a connection to a network to continue a user session of an application from one device to another device, the method comprising:

receiving, via the communication platform, at a session information receiving unit from a first device, information related to a first user session of a first application installed on the first device, wherein the first user session is associated with a certain user identity, and wherein the information related to the first user session indicates content and a presentation of the content provided via the first application on the first device, the certain user identity being previously authenticated using credential information provided at the first device;

storing, at a storage unit, the information related to the first user session of the first application;

receiving, via the communication platform, at a session information transmission unit from a second device, a request for the information related to the first user session of the first application directed at a predetermined uniform resource locator (URL) different from one or more particular Internet based addresses used by the first device to access the content prior to the request being received, wherein the request is associated with the certain user identity, the certain user identity being previously authenticated using the credential information provided at the second device; and providing, by the session information transmission unit, the information related to the first user session to the second device so that a second user session of a second application at the second device provides the content in the presentation indicated by the information related to the first user session, wherein the second user session is associated with the certain user identity, and wherein the first and second applications have at least one common function.

2. The method of claim 1, further comprising:
storing, at the storage unit, the credential information related to the certain user identity;
receiving, by an authorization unit, from the second device, a request to authenticate the certain user identity prior to said receiving a request for the information related to the first user session; and
authenticating, by the authorization unit, the certain user identity based on the credential information.

3. The method of claim 1, further comprising:
receiving, by the session information receiving unit, from the second device, information related to the second user session of the second application, wherein the information related to the second user session indicates different content, a different presentation of the content, or both, provided via the second application following the presentation, on the second device, of the content indicated by the information related to the first user session; and
storing, at the storage unit, the information related to the second user session of the second application.

4. The method of claim 1, wherein the first and second applications are browsers.

5. The method of claim 4, wherein the first and second applications are different browsers.

6. The method of claim 1, wherein the content includes one or more of a webpage, a webpage address, a search query, results of a search query, user-generated text, a video file, an audio file, and an image file.

7. The method of claim 6, wherein the presentation includes one or more of a scroll position of the webpage, a font size, a font style, a font color, and a highlighted portion of the content.

8. A machine readable, tangible, and non-transitory medium having information recorded thereon to continue a user session of an application from one device to another device, where the information, when read by the machine, causes the machine to perform at least the following:
receiving, from a first device, information related to a first user session of a first application installed on the first device, wherein the first user session is associated with a certain user identity, and wherein the information related to the first user session indicates content and a presentation of the content provided via the first application on the first device, the certain user identity being previously authenticated using credential information provided at the first device;
storing, at a storage unit, the information related to the first user session of the first application;
receiving, from a second device, a request for the information related to the first user session of the first application directed at a predetermined uniform resource locator (URL) different from one or more particular Internet based addresses used by the first device to access the content prior to the request being received, wherein the request is associated with the certain user identity, the certain user identity being previously authenticated using the credential information provided at the second device; and
providing the information related to the first user session to the second device so that a second user session of a second application at the second device provides the content in the presentation indicated by the information related to the first user session, wherein the second user session is associated with the certain user identity, and wherein the first and second applications have at least one common function.

9. The medium of claim 8, wherein the machine is further caused to perform the following:
receiving, from the second device, information related to the second user session of the second application, wherein the information related to the second user session indicates different content, a different presentation of the content, or both, provided via the second application following the presentation, on the second device, of the content indicated by the information related to the first user session; and
storing, at the storage unit, the information related to the second user session of the second application.

10. The medium of claim 8, wherein the first and second applications are different browsers.

11. A system to continue a user session of an application from one device to another device, the system comprising:
a storage unit;
at least one processor programmed to execute one or more computer program instructions which, when executed, cause the at least one processor to:
receive, from a first device, information related to a first user session of a first application installed on the first device, and store the information related to the first user session at the storage unit, wherein the first user session is associated with a certain user identity, and wherein the information related to the first user session indicates content and a presentation of the content provided via the first application on the first device, the certain user identity being previously authenticated using credential information provided at the first device; and
receive, from a second device, a request for the information related to the first user session of the first application directed at a predetermined uniform resource locator (URL) different from one or more particular Internet based addresses used by the first device to access the content prior to the request being received, wherein the request is associated with the certain user identity, the certain user identity being previously authenticated using the credential information provided at the second device, and
provide the information related to the first user session to the second device so that a second user session of a second application at the second device provides the content in the presentation indicated by the information related to the first user session, wherein the second user session is associated with the certain user identity, and wherein the first and second applications have at least one common function.

12. The system of claim 11, wherein the storage unit is configured to store the credential information related to the certain user identity, and
wherein the at least one processor is further configured to receive, from the second device, a request to authenticate the certain user identity prior to receiving a request for the information related to the first user session, and authenticate the certain user identity based on the credential information.

13. The system of claim 11, wherein the at least one processor is further configured to:
    receive, from the second device, information related to the second user session of the second application, wherein the information related to the second user session indicates different content, a different presentation of the content, or both, provided via the second application following the presentation, on the second device, of the content indicated by the information related to the first user session, and
    store, at the storage unit, the information related to the second user session of the second application.

14. The system of claim 11, wherein the first and second applications are different browsers.

15. The system of claim 11, wherein the content includes one or more of a webpage, a webpage address, a search query, results of a search query, user-generated text, a video file, an audio file, and an image file.

16. The system of claim 11, wherein the presentation includes one or more of a scroll position of the webpage, a font size, a font style, a font color, and a highlighted portion of the content.

17. A device to continue a user session of an application initiated on another device, the device comprising:
    at least one processor programmed to execute one or more computer program instructions which, when executed, cause the at least one processor to:
        execute a first application to initiate a first user session;
        send a request for information related to a second user session of a second application installed on another device, wherein the request is directed at a predetermined uniform resource locator (URL) different from one or more particular Internet based addresses used by the first device to access the content prior to the request being received, wherein the information related to the second user session indicates content and a presentation of the content provided via the second application on the other device, and wherein the first and second applications have at least one common function, wherein the request is associated with a certain user identity, the certain user identity being previously authenticated using credential information provided at the device;
        receive, via a communication platform capable of making a connection to a network, the information related to the second user session of the second application, wherein the second user session is associated with the certain user identity, the certain user identity being previously authenticated using the credential information provided at the other device; and
        provide, in the first user session of the first application, the content in the presentation indicated in the information related to the second user session, wherein the first user session is associated with the certain user identity.

18. The device of claim 17, wherein the predetermined URL is assigned to a session continuation server.

19. The device of claim 17, wherein the at least one processor is further caused to:
    send account information to authenticate a certain user identity associated with the first user session prior to sending a request for the information related to the second user session; and
    receiving an indication that the certain user identity is valid for the first user session.

20. The device of claim 17, wherein the at least one processor is further caused to:
    send information related to the first user session of the first application, wherein the information related to the first user session indicates different content, a different presentation of the content, or both, provided via the first application following the presentation, on the first device, of the content indicated by the information related to the second user session.

* * * * *